(12) United States Patent
Anderson

(10) Patent No.: US 9,813,610 B2
(45) Date of Patent: Nov. 7, 2017

(54) METHOD AND APPARATUS FOR RELATIVE CONTROL OF MULTIPLE CAMERAS USING AT LEAST ONE BIAS ZONE

(71) Applicant: TRACE OPTICS PTY LTD, South Australia (AU)

(72) Inventor: Jeremy Lorenz Anderson, South Australia (AU)

(73) Assignee: Trace Optics PTY LTD, South Australia (AU)

( * ) Notice: Subject to any disclaimer, the term of this patent is extended or adjusted under 35 U.S.C. 154(b) by 4 days.

(21) Appl. No.: 14/560,836

(22) Filed: Dec. 4, 2014

(65) Prior Publication Data

US 2015/0085131 A1   Mar. 26, 2015

Related U.S. Application Data

(63) Continuation-in-part of application No. 13/392,515, filed on Feb. 24, 2012, now abandoned.

(51) Int. Cl.
*H04N 5/232* (2006.01)
*H04N 5/247* (2006.01)
*H04N 7/18* (2006.01)

(52) U.S. Cl.
CPC ......... *H04N 5/23216* (2013.01); *H04N 5/247* (2013.01); *H04N 7/181* (2013.01)

(58) Field of Classification Search
CPC ..... H04N 5/23216; H04N 5/247; H04N 7/181
USPC ........................................................ 348/157
See application file for complete search history.

(56) References Cited

U.S. PATENT DOCUMENTS

| 5,953,056 A | 9/1999 | Tucker |
| 6,567,116 B1* | 5/2003 | Aman ................ A63B 24/0021 348/164 |
| 2003/0210329 A1 | 11/2003 | Aagaard |
| 2007/0058839 A1 | 3/2007 | Echegaray |
| 2010/0026809 A1* | 2/2010 | Curry ..................... H04N 5/222 348/157 |

FOREIGN PATENT DOCUMENTS

| WO | WO2006024078 | 3/2006 |
| WO | WO2007133982 | 11/2007 |
| WO | WO2008057285 | 5/2008 |

* cited by examiner

*Primary Examiner* — Christopher S Kelley
*Assistant Examiner* — Maria Vazquez Colon
(74) *Attorney, Agent, or Firm* — Defillo & Associates, Inc,; Evelyn A Defillo

(57) ABSTRACT

The present invention relates a method of obtaining motion picture footage of a moving object within an environment, being a surveyed environment or an environment of known dimensions. The method including the steps of: creating a computer generated virtual map of the environment within a control apparatus. At least one bias zone overlays the virtual map, the at least one bias zone being a predetermined or variable pattern, capturing a dynamic primary image of said object using a first motion picture camera, and capturing a dynamic halo image that extends around the primary image using a second motion picture camera. The said first and second motion picture cameras being controlled by the control apparatus such that a position or size of the halo image relative to the primary image is regulated by the at least one bias zone.

21 Claims, 9 Drawing Sheets

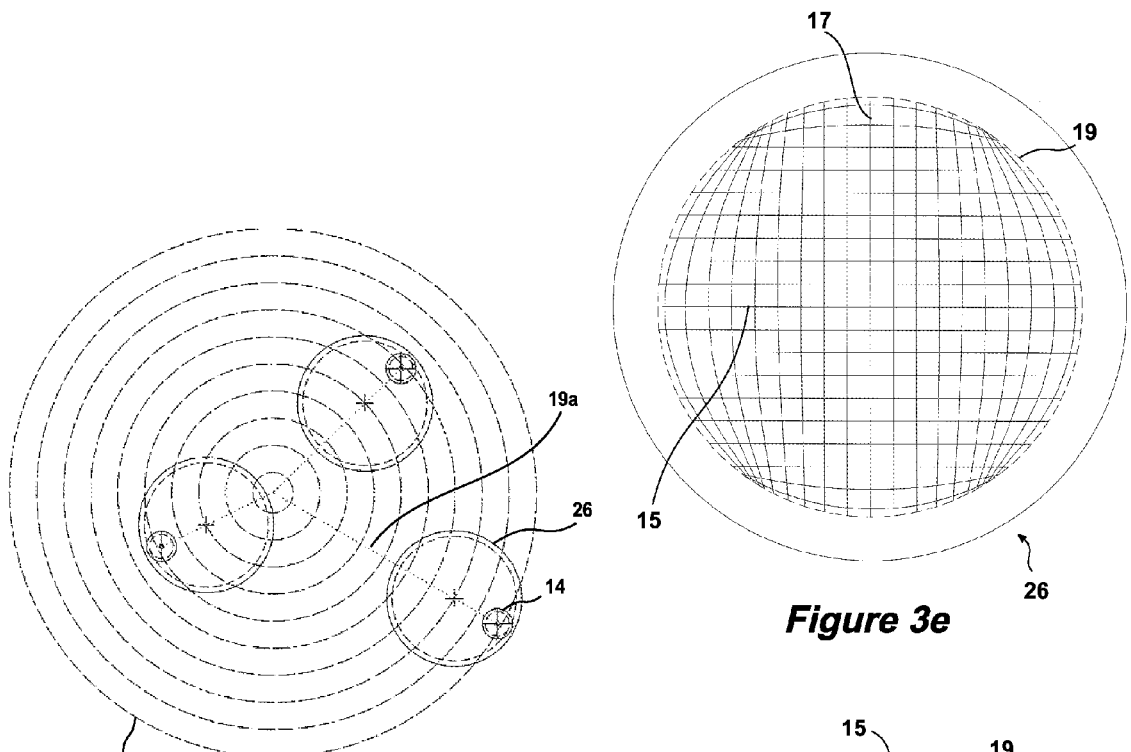
Figure 3c
Figure 3e
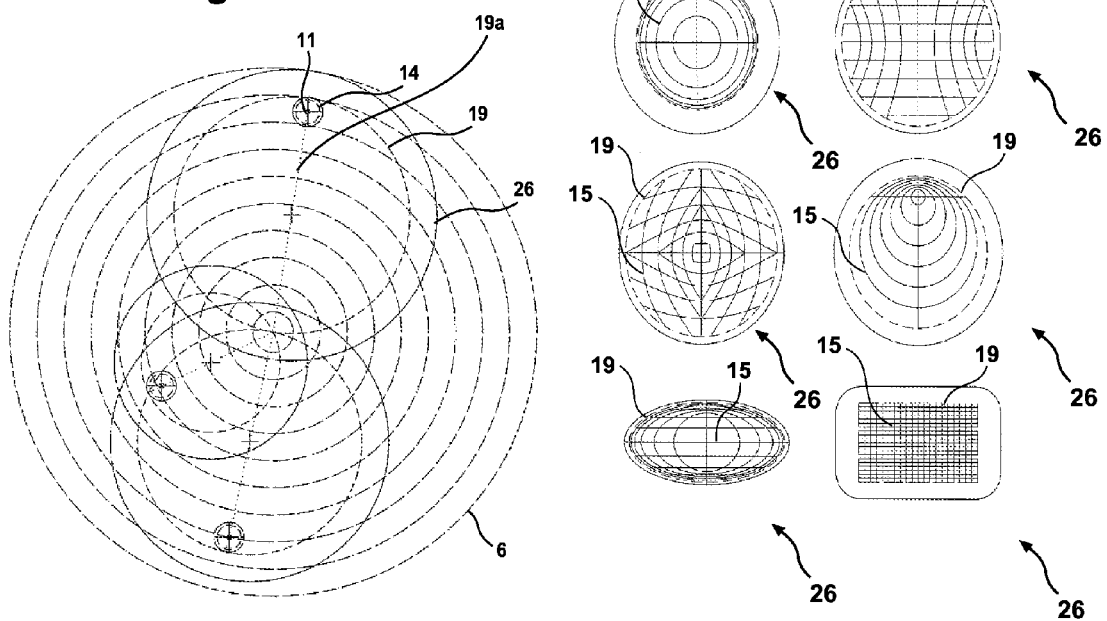
Figure 3d
Figure 3f

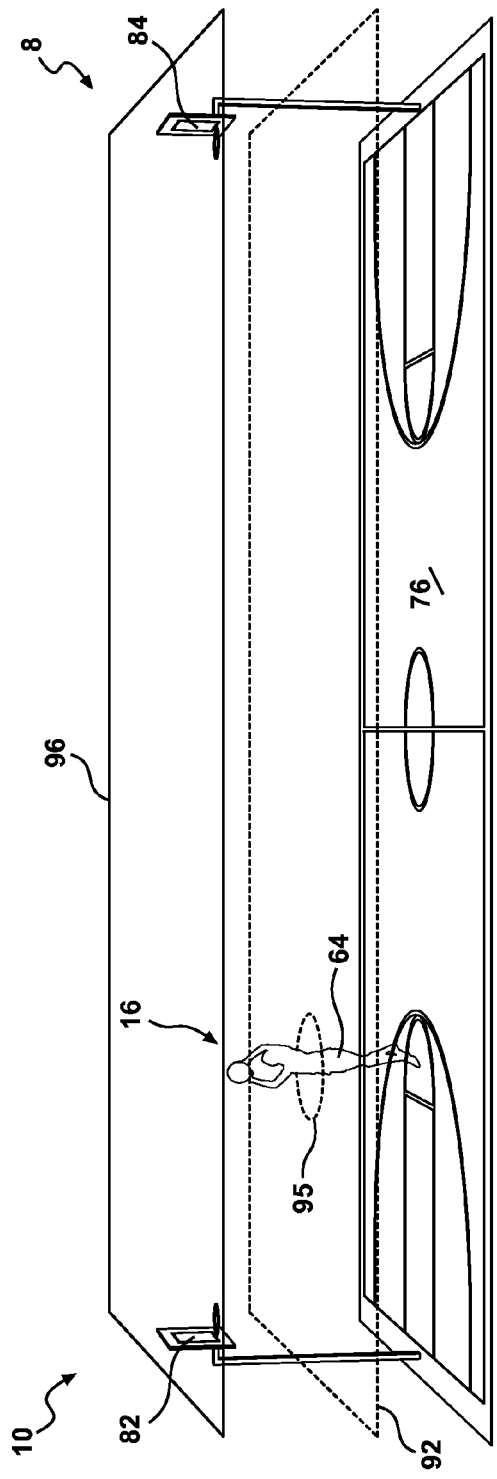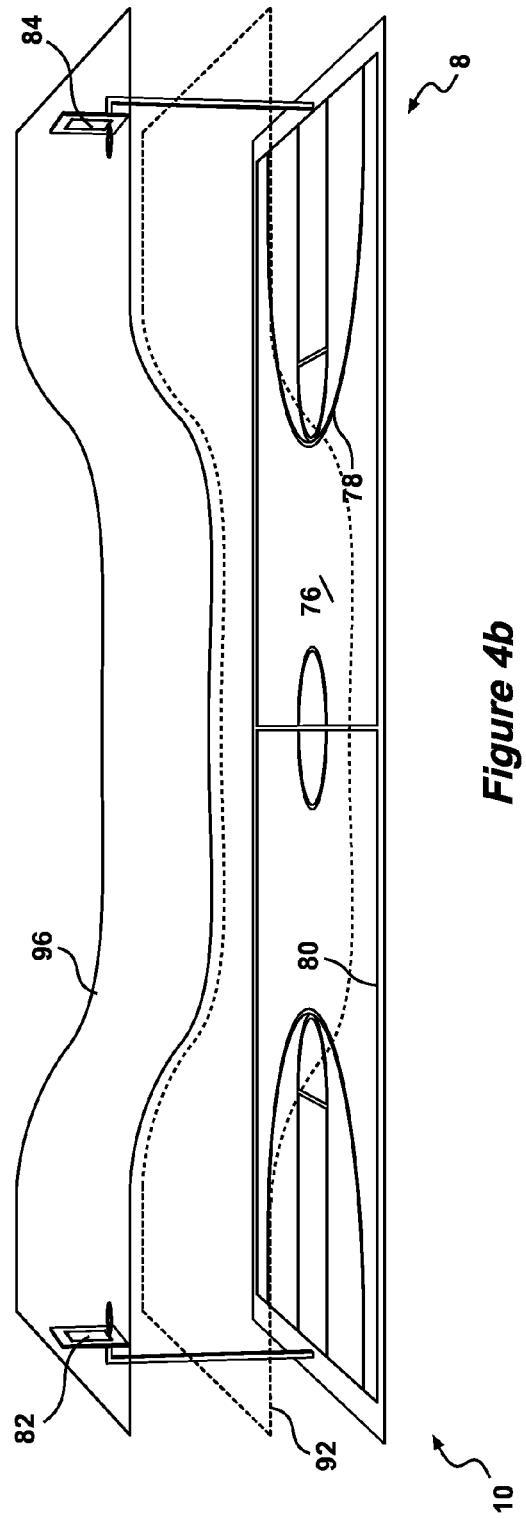

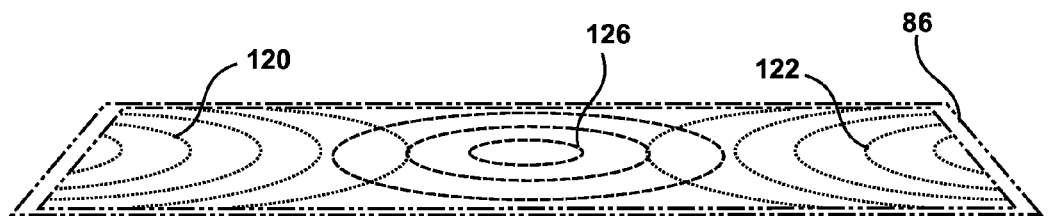
Figure 7c
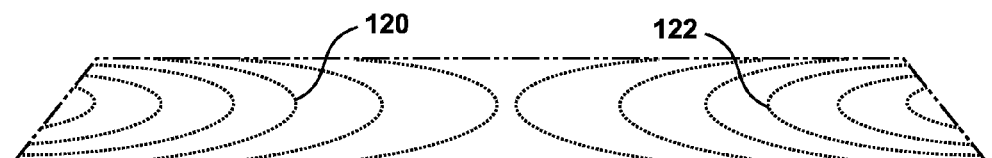
Figure 7b
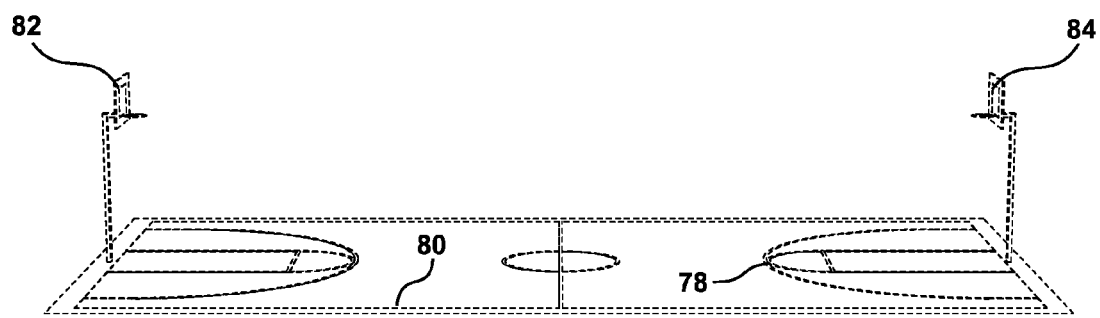
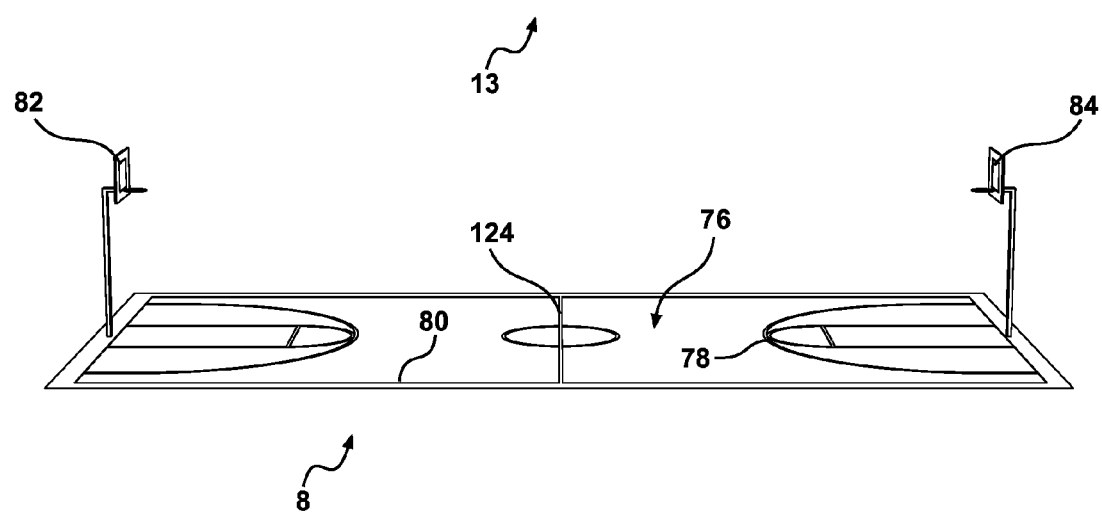
Figure 7a

METHOD AND APPARATUS FOR RELATIVE CONTROL OF MULTIPLE CAMERAS USING AT LEAST ONE BIAS ZONE

RELATED U.S. APPLICATION

This application is a continuation-in-part of U.S. application Ser. No. 13/392,515 filed Feb. 24, 2012, entitled, METHOD AND APPARATUS FOR RELATIVE CONTROL OF MULTIPLE CAMERAS, pending, the content of which is incorporated herein by reference, which is a US national stage entry of PCT/AU2010/000886 filed Jul. 13, 2010, under the International Convention, which claimed priority over Australian Patent Application No. 2009904169 filed Aug. 31, 2009.

FIELD OF THE INVENTION

The present invention relates generally to the field of camera control systems and in one aspect relates to the control of at least two cameras for capturing different images of an object moving across a surface wherein a primary image is contained, and movable within, a halo image, the position of the halo image being dependent upon the movement of the object and controlled by at least one bias zone overlaying a computer generated virtual map of the present invention.

The reader should appreciate that the term 'dynamic' used throughout the specification relates to the capturing of video footage. Accordingly, the phrases 'dynamic primary image' and 'dynamic halo image' used throughout the specification relate to the video that may comprise a plurality of sequential images that form the footage captured by respective cameras.

BACKGROUND OF THE INVENTION

Televised sporting events are extremely popular on both free-to-air and pay television, with many channels being solely dedicated to sport. With the advent of more advanced camera technology, quality has increased and new camera shots have been achieved. Cameras located in cricket stumps and inside race cars are now common.

Many sporting activities, such as football and basketball, require complex shot sequences captured using a traditional tripod mounted movable camera controlled by skilled camera operator trained to capture the live action. The present invention provides an alternative where by the cameras can be controlled automatically using servos and encoders enabling an autofocus, and auto zoom, auto pan and tilt. This system enables the camera to receives control signals from a control apparatus to facilitate the capturing of imagery of the game. The cost of placing a skilled camera operator behind each camera is one of the limitations of the manually controlled systems. Furthermore due to health and safety issues regarding the operator, the placement of cameras around the perimeter of the playing field is restricted. A further limitation of a manually controlled system is that camera operators can obscure the action of the sport or stage productions, when close ups are needed as is the case with boxing and ice hockey.

There are numerous automated camera control systems currently available. Most of these systems fall within two categories, namely control systems that utilises a tagged objects, and master/slave camera control systems. System using tags can however be simplistic, and do not provide for the framing and compositional variables that are required for modern day television broadcasting. On the other hand one of the problems with master/slave systems is that the images captured by the slaved cameras are the same as those captured by the master camera, the only difference being that the angle from which the image is captured is different for each camera.

It should be appreciated that any discussion of the prior art throughout the specification is included solely for the purpose of providing a context for the present invention and should in no way be considered as an admission that such prior art was widely known or formed part of the common general knowledge in the field as it existed before the priority date of the application.

SUMMARY OF THE INVENTION

In accordance with an aspect of the invention, but not necessarily the broadest or only aspect there is proposed a method of obtaining motion picture footage of a moving object within an environment, being a surveyed environment or an environment of known dimensions, including the steps of:

creating a computer generated virtual map of the environment within a control apparatus, wherein at least one bias zone overlays the virtual map, the at least one bias zone being a predetermined or variable pattern; capturing a dynamic primary image of said object using a first motion picture camera; and capturing a dynamic halo image that extends around said primary image using a second motion picture camera, wherein said first and second motion picture cameras being controlled by said control apparatus such that a position or size of the halo image relative to the primary image is regulated by the at least one bias zone.

The virtual map is synchronized with the known or mapped environment and the bias zone or zones overlay the virtual map within the software program. Accordingly the bias zone or zones are superimposed over the virtual map to control the relative composition of the primary and halo images captured by the first and second motion picture cameras.

The object may be a ball being used in a sporting contest, wherein the primary and halo images include motion picture footage of at least the ball. The primary and halo images may further include motion picture footage of an individual or individuals engaged in the sporting contest, goals, wickets or relevant line markings.

In one form a track node replicates, within the computer generated virtual map, the actual movement of the object within the known or mapped environment, or a target or targets within said environment, or a position between said object and said target or targets.

The quality and framing of the dynamic primary image is defined by the field of view (zoom) and subject distance (focus) of a lens of said first camera and the camera's alignment on the servo pan tilt head. The quality and framing of the dynamic halo image is defined by the field of view and subject distance of a lens of the second camera and the camera's alignment on the servo pan tilt head. The shape of the primary image and halo image can be, but are not limited to circles, ovals, squares and rectangles.

In one form the primary image and halo image, defined by respective field of views and subject distances, can be altered. This is important because the composition of camera footage that is the most desirable for a viewer will vary depending upon the behaviour of the player or players engaged in play.

In this way close up footage of the object, such as a particular sports player can be captured with one camera whilst automatically capturing with secondary cameras the wider area around the player that may include opposing players that may contests for the ball, or team mates to which the ball may be passed.

In another form the object being tracked is a ball being used to play a sport such as soccer or basketball and the motion picture primary image and halo images move thereby include the ball and individual or individuals engaged in play or other images of audience interest. The term play referred to the progress of the game in which the individual player or players are actively engaged in.

As a player runs down the field the halo image may be positioned forwardly of one side around the primary image, wherein the halo image extends forward of the player and includes defending players that are in close proximity to the first player and that may engage them in play within a short period of time.

The method may use at least one primary image contained within at least one halo image. Typically an operator may use the halo image or multiple halo images. In another form the primary and halo images may be locked onto a pre-defined object, including a physical tag device (such as a RF tag), or movable point herein referred to as a 'track node', which may follow the game ball, player or vehicle. The reader should appreciate that throughout the specification the term track node refers to a series of points having x, y, z coordinates within a mathematical model that is created by surveying and mapping the surface of a environment or knowing the dimensions of the environment. The track node may replicate, within the mathematical model, the actual movement of a selected object across the mapped surface or alternatively it may replicate the movement of a pointer across a touch screen that is used to track the movement of an object within the known or mapped environment.

The size of the primary and halo images can be individually adjusted. The images' size can also be set as either a percentage of the primary image, or as an adjustable fixed size, or as a variable logarithmic percentage of the primary image. The size of a halo may also be determined via the position of the track node within a bias zone. The bias zone may have predefined parameters that control the position of the primary and halo images around the tagged object or track node. The predefined parameters are preferably stored in software.

Primary and halo images are preferably controlled by software to facilitate the often complex requirements of correct framing of any given sport or activity. The following basic summary alerts the reader to some of the complexities of these interactions. The images encircle the tracked object, have offset limit lines that keep the tracked object within specified boundaries.

These boundaries can be thought of as a fence that stops the tracked object from exiting. The images also have location fields within the limit lines.

The location field positions the image around the tracked object depending on the tracked objects position within the bias zone which typically covers the entire playing arena and the direction of travel which is an Operator adjusted function. The space where images can be moved is also restricted by the bump bars, which are typically located just outside the boundary of the playing field or performance space. The reader should now appreciate that to fully understand the functionality of capturing the images, the reader must also appreciate the interrelated functions of the other software functions. Further detailed descriptions of these functions are contained in subsequent sections.

The images may have limit lines, which are parallel line to the image's external edge that can be offset at specified distances or at a percentage of the image's diameter or longest side. Images are designed to capture the tracked object or track node within the image's limit lines. The limit lines effectively give the object or player being framed some space around them before the edge of the television picture frame. The limit lines also have a variable cushioning effect that enable the track node to have a range of hard to soft collisions with the limit line. This cushioning effect enables a smoother visual motion picture without jerky changes in direction. On specified occasions the limit lines can be outside the image, thereby enabling the track node to be captured but still outside the image. The limit lines can be offset from the outside edge of the image, and the methods of offset include, a specified distance, specified percentage of the diameter or diagonal, and a combination of both percentage and specified minimum and maximum distances.

The reader should appreciate that a zoom window of the first motion picture camera may correspond to the size of the dynamic primary image and a zoom window of a second motion picture camera may correspond to the size of the dynamic halo image.

Accordingly, in one form the zoom windows of the first or second motion picture cameras may include respective location fields. The respective zoom windows may also include a limit line or limit lines, which are spaced apart from an edge of the corresponding zoom window, whereby the track node within the virtual map is inhibited from contacting an edge of the zoom window.

However, the reader will appreciated that the footage captured by either of the first or second motion picture cameras may be cropped or otherwise altered and may not corresponding exactly to the corresponding zoom window.

In still another form the relationship between the primary and halo images is relative to, and controlled by, a control apparatus. In one form the size of the primary image may be proportional, to the halo image. This proportion relationship may be directly or inversely proportional or be linear or exponential.

In yet another form each image has a location field that consist of an x, y and z axis that typically bisects through the centre of the image. Location fields have variable patterns, which include but are not limited to, orthogonal patterns with one or two axis, curved grid patterns, parabolic patterns, or concentric circle patterns. The track node which is the object being tracked, interacts with the following; the location fields, the direction of travel, and the bias zones to enable the correct motion picture framing of the tracked object within the televisions picture frame. In one form the location field adjusts the position of the track node along its x axis, proportion to the direction of travel of the track node. The location field adjusts the position of the track node along its y axis, proportion to the track node's position within the bias zones. Further information on the methods of interaction between track nodes, location fields, direction of travel and bias zones are contained in subsequent sections.

The images movement, size, position and relationship with each other, may vary depending on the tracked object's velocity, direction of travel, behaviour, position with the bias zone and relative direction with respect to the physical location of the first or second camera.

The relationship may also be altered depending upon the character of the object being tracked. For instance where a player is being tracked their movement and behaviour will be restricted to a narrow flat band adjacent a playing surface. In contrast the movement and behaviour of a football being kicked would be quite different and would be within a broader band that extends upwardly from the playing surface. Accordingly the relationship may be altered by the trajectory or expected trajectory of the ball. In such a situation the dynamic primary image may follow the trajectory of the ball whist the dynamic second halo image may capture footage of the expected landing area that has been calculated from the trajectory of the ball.

Typically the primary image is positioned within the halo image, although it should be appreciated that the halo image may be separated from the primary image. For instance when a player is attempting a shot at the goal the halo image may be uncoupled from the primary image such that the second camera is directed at the goal when the track node or ball comes into contact with the specified area. The uncoupling of the halo image from the primary image may be done automatically by way of computer software when the target object is located within a predetermined space such as the goal square. Alternatively this uncoupling can be performed via the user interface and in one form a switch may be used. The uncoupling of the images or halos may also occur when footage of the crowd, coach's box, or other predetermined areas is required. This uncoupling and repositioning of the second camera may be performed by separate control switches.

In still another form multiple halo images can surround the primary image and each halo image can have its own specified size. The capturing of the images is controlled by software that may include, bump bars, direction of travel, framing limit lines, split button, and proportional head room framing. Individual halo images may be able to interact with the software while the primary image may not interact. The operator can individually activate or deactivate each image's interaction with the software.

In accordance with a second aspect of the invention there is proposed a motion picture capturing apparatus including, a first camera for capturing a dynamic primary image of a moving object, a second camera for capturing a dynamic halo image that extends around the primary image, and a control apparatus for controlling the position of said dynamic halo image around the said dynamic primary image.

In accordance with the above apparatus the first camera and all secondary cameras are controlled by servo-assisted pan tilt heads and servo assisted lenses that control the focus and zoom. In one form the control apparatus further controls the pan, tilt, zoom and focus of the respective first and all secondary cameras.

The relationship between the primary image and all halo images may be altered by use of the control apparatus that may include a user interface and designated software. This user interface may include a touch screen, which shows live video and a synchronised 3D model of the playing area.

The invention requires the synchronisation of the virtual 3D computer generated environment or map with a camera's real world view of the same environment. This synchronisation enables the operator to see the overlayed 3D model, such as a soccer field line markings, over the video. This enables the operator to working in the 3D model computer world while still seeing what is happening via the video. This synchronisation typically requires: the calibration and charting of the servo encoded lens's zoom and focus; a 3D model of the environment created either by surveying the environment or by having a knowing standard environment such as tennis court; the cameras having known 3D locations with associated x, y, z coordinates and the pitch and yaw of the horizontal plane of the camera head is also known; and each camera being mounted onto a servo encoded pan tilt head.

This synchronisation enables a computer to determine the camera's field of view via the encoders reading of the pan, tilt, zoom and focus settings. As a result the operator sees an accurate virtual 3D model superimposed over the real world video. Thus when a camera's field of view moves, then the synchronised 3D model also precisely moves in real time. This synchronisation now enables one human operator to accurately command and control in real time multiple cameras around a designated area and see the camera vision and the superimposed 3D geometric and spatial software functions working. This can enable far superior accuracy of framing and focusing on dynamic targets.

In one form the control apparatus further includes a broadcast switching device to enable the operator to select the footage that is to be broadcast or recorded. The component of the apparatus, such as the cameras, display means and control apparatus may be connected by way of a communication means such as, but not limited to, a modem communication path, a computer network such as a local area network (LAN), Internet, RF or fixed cables. This means that a user can control the operation of multiple cameras from a single location.

In another form the processor and the memory cooperate with each other and with other components of a computer to perform all of the functionality described herein. In another form the processor executes appropriate software to perform all of the functionality described herein.

In still another form the control apparatus is a computer including RAM and ROM memory, a central processing unit or units, input/output (IO) interfaces and at least one data storage device. The computer includes application software for controlling the cameras and performing functions, stored in a computer readable medium on a storage device. The apparatus may include embedded software or firmware with corresponding hardware that is designed to perform one or more dedicated functions. In one form the processor and the memory cooperate with each other and with other components of a computer to perform all of the functionality described herein.

In a third aspect of the invention there is proposed a software program for controlling the operation of the preceding apparatus and for the application of the preceding and following methods.

In one form the control apparatus includes a computer monitor with a virtual model or map of the playing surface which overlays in real time over the synchronised camera, which has the same perspective as the virtual model. The virtual model may include such things as the boundaries of the playing surface, goals and relevant line markings. It is within the computer model that the operator can command and control and see the various geometric and spatial software functions working over the cameras video.

In accordance with a fourth aspect of the invention there is proposed a motion picture capturing apparatus including, a first camera for capturing a dynamic primary image of a moving object, at least one second camera for capturing a dynamic halo image that substantially extends around the primary image, and a control apparatus for controlling the position of said dynamic images.

In one form a track node may be stored within software to facilitate the positioning of the said primary and halo images. Track nodes are mathematical points that can be assigns to track vehicles, players or the match ball to give them a positional reference. The real time position of the track node is governed by, but not limited to GPS devices, RF tagging devices, optical recognition devices, and manual tracking using either a mouse or a stylist on a touch screen. Images can be individually assigned to specified track nodes. Track node can spatially interact with the images in a variety of ways. A track node may be locked onto the cutting plane there by setting the height of the track node away from the playing surface, while allowing the track node to travel across the cutting plane in any direction, speed and acceleration. The track node can also be offset from the cutting plane in a variety of methods that include but not limited to, a wheel on a mouse, a wheel within a control interface, and depressing a button and using a touch screen stylist to move the stylist either up or down the touch screen.

The computer uses the position of the track node to calculate the subject distance for the lenses' focus settings, thereby enabling the area around the track node to always be in focus. The subject distance is the distance from the lens to the subject or tracked target. Multiple track nodes can be utilised where there are multiple targets requiring tracking. Nominated cameras can be exclusively assigned to specified track nodes while interacting with the software devises.

In accordance with a fifth aspect of the invention there is proposed software functions herein referred to as a cutting plane. The cutting plane enables the images to have the z-axis position as the cutting planes surface.

The cutting plane is a mathematical plane contained within software that is offset from the playing surface at variable heights. The plane can be parallel to a designated surface, or it can be a curved or variable surface over the playing field or surface. The cutting plane can also be shaped into any profile such as a plane that is offset 1 meter and parallel to a complex and undulating motor racing track. Typically cutting planes will extend well beyond the primary playing area into secondary areas, such as the surrounding playing areas, grand stands and vehicular run off areas. The primary function of the cutting plane is to allow the track nodes, and thereby the captured images to travel across the cutting plane's surface or be offset from it. The cutting plane enables better accuracy when tracking motor vehicles because the vehicles height from the racing track is always known (unless the vehicle is flying), therefore GPS tracking inaccuracies in the Z direction or height can be removed.

The bias zone contained within the software may interact with the track node's position within the bias zone to dictate how the images are positioned around the track node. Bias zones have predetermined or variable patterns that include but are not limited to an orthogonal pattern with one or two axis, a concentric circle pattern, a curved grid pattern, a parabolic pattern, an oval pattern, a lattice pattern, a regularly repeating pattern or an irregular pattern. Although it should be appreciated that other patterns could be used without departing from the scope of the invention.

The track node may travel either side of the bias zones' x axis and the further the track node is away from the x axis, then the further away the track node is from the image's x axis while still staying within the image's limit line. Multiple bias zones may also be utilized, for example an orthogonal bias zone covering an entire soccer field and two concentric circle bias zones each with a 30 m radius centered on each goal. The resultant effect on the halo images around the track node is based on the averaging of the two bias zones effect, which of course is dependent on the track nodes position with the bias zones.

In still another form a direction of travel function may be stored within the software and in one form may be manually controlled via an adjustable slide device which as a neutral middle position and variable forward and back calibrations. The direction of travel creates leading space forward or behind the track node within the images. The further the slide is away from its neutral position, then the further the halo image's centre is offset from the track node.

For example, 90% forward on the slide, results in the track node being located 90% back from of the images centre, there generating a very large leading space within the halo image in front of the track node. The magnitude of the leading space or distance between the track node's position and the offset from the image location field's y axis, is proportional to the magnitude of the direction of travel. Which side of the images that the leading space occurs, is governed by the operator and is typically dependent on which way the ball is going.

In still another form a bump bar function may be stored within the software. Bump bars are a software spatial ordering function that enable the images to bump into them, but generally do not let the images pass over their geometric alignment. Bump bars are like a fence that can be aligned where required, to frame the perimeter of the playing field. Bump bars have a variable deceleration setting that enables the halo images to cushion into the bump bars before contact occurs.

The images have 3 optional functionalities that enable them to, firstly, recognize bump bars and cushion into them, secondly to ignore the bump bars and their associated functions, and thirdly a hybrid option where the halo images use the bump bars until the primary halo crosses the bump bar at which point the halo image will continue to surround the primary image as both images cross over the bump bars. The bump bars stop the specified images from departing the area of the playing field, thereby keeping the cameras field of view on the playing surface and on the players.

In yet still another form a picture frame function may be stored within the software. The picture frame is a software ordering function that graphically shows the camera's "16×9 picture plane" around the captured image. The sides of the picture frame always touch the images' external edges relative to the viewing alignment of the camera. As such if the image expands then the picture frame expands.

The sill and head heights of the picture frame and the centre of the picture frame can be set in a variety of methods. Firstly, the bottom alignment of the picture frame or sill can have an vertical offset distance from either the cutting plane or track surface at the track node's location, secondly the picture frame can be set so that a specified horizontal axis or band of the picture frame always retains the track node on it while the picture frame holds the entire captured image, and thirdly the side of the captured image closest to the camera will rest on the picture frame's sill.

An additional over riding function on the height of the picture frame head height is the proportional head room function which interacts with the size of the images and the height of the cutting plane so that when the picture frame's top alignment has reached a certain specified height above the playing surface, then the picture frame's height will not drop any further and if the picture frame needs to reduce in size because of a contracting image size, then the picture frame's bottom alignment or sill will rise allowing for the picture frame to shrink in size. This proportional framing function can also be used in an inverse fashion, so that the operator can zoom in on the player's feet in a similar manner. Picture frames and the visual limit plane have a geometric relationship that stop the picture frame from passing across a visual limit plane.

In a further form a visual limit plane function may be stored within the software. A visual limit plane is of any size and shape that can be positioned at any horizontal, vertical or angular alignment. The visual limit plane is a spatial software function that enables the camera's view to be restricted from looking past a specified alignment or plane. The visual limit plane affect the camera's zoom, pan and tilt. In a typical sporting application like soccer, the visual limit plane will be located just under the roof line of the stadium, and when the wide field of view camera and its associated wide image are tracking a player on the far side of the field then the head of the picture frame would contact the visual limit plane and stop the camera's field from seeing under the stadium roof and push the camera's field of view further onto the playing field where the action is.

Visual limit planes can be set individually for each camera and are particularly useful when located just under the roof of stadiums, stage boundaries, or edges of unsightly structure. The operator can set the visual limit planes and bump bars in appropriate positions within the 3D model which is superimposed over the real time video and examine all camera views for functionality and aesthetic composition.

In still another form a split button function may be stored within the software and enables the operator to push a button, there by releasing the specified images from the cutting plane to follow a target such as a basketball through a' path of travel. When the split button command is activated, the system recognises the track node's location and draws a base line from that point to the designated target point which can be the centre of the basketball or netball hoop. In basketball, the operator can depress the split button and then track the flying ball through the air using the stylist on the touch screen. Assuming the ball is directed at the hoop, then the 3D model understands the base line direction of travel and the vertical offsets created by the flight of the ball. This enables the cameras to follow the ball's flight path.

In still a further form an image tally light function may be stored within the software. The image tally light indicated to the operator which camera is being used at any given moment as the live feed. The image tally light may highlight the live feed camera's halo or picture frame.

In yet still another form a vista line function may be stored within the software and creates a series of lines within the virtual 3D computer model that start at a camera location and extend to the tangent points on both sides of that camera's images. The lines may be terminated at either the image's tangents, or cutting plane, or designated distance past the image. Similarly the centre vista line starts at the camera location and extends to the track node and may terminate as at the track node, or cutting plane, or designated distance.

In still yet a further form a hierarchy of commands function may be stored within the software. Many of the aforementioned functions interrelate with each other and in some circumstances may desire to over ride each other. As such a hierarchy of commands is structured within the system requirements, enabling commands to overrule other commands.

In yet still a further form a relative zoom points function may be stored within the software. This software function enables a point on the cutting plane to be selected i.e. the soccer goals, and for that point to stay in the same location within the camera's field of view as the operator zooms in or out either by manual controls or in a preset manner. This software command can also utilise the camera's picture plane via the systems understanding of the lens's field of view.

In another form a pan point function may be stored within the software and enables the operator to select two points, a genesis point and a terminus point, where by the designated camera will pan between these points along a designated path. This designated path or spline can be adjusted by the operator to form any alignment within a 3D space. The zoom setting or key framing at the genesis and terminus points and at any number of points along the spline can be designated so that the lens' zoom extrapolates evenly between them as the camera's centre of view pans along the spline. Time, zoom settings, and speed between the pan points can be specified.

BRIEF DESCRIPTION OF THE DRAWINGS

The accompanying drawings, which are incorporated in and constitute a part of this specification, illustrate implementations of the invention and, together with the description and claims, serve to explain the advantages and principles of the invention. In the drawings.

FIG. 3c is a schematic view of a fixed size primary and halo images and their interaction pattern as they move within the circular bias zone;

FIG. 3d is a schematic view of a fixed size primary image and variable size halo image and their interaction pattern as they move within the circular bias zone;

FIG. 3e is a schematic view of a halo and its component parts;

FIG. 3f is a schematic view of some of the embodiments of a halo;

FIG. 4a is a schematic view of the primary image of FIG. 1 illustrating a first embodiment of the vertical barrier above the playing surface;

FIG. 4b is a schematic view illustrating a second embodiment of the vertical boundary above the playing surface;

FIG. 7a is a schematic view of the known or mapped environment and the virtual map of the known or mapped environment;

FIG. 7b is a first embodiment of the bias zone that overlays the virtual map; and FIG. 7c is a second embodiment of the bias zone illustrating multiple overlaying patterns that overlay the virtual map.

DETAILED DESCRIPTION OF THE ILLUSTRATED AND EXEMPLIFIED EMBODIMENTS

Figure 1:
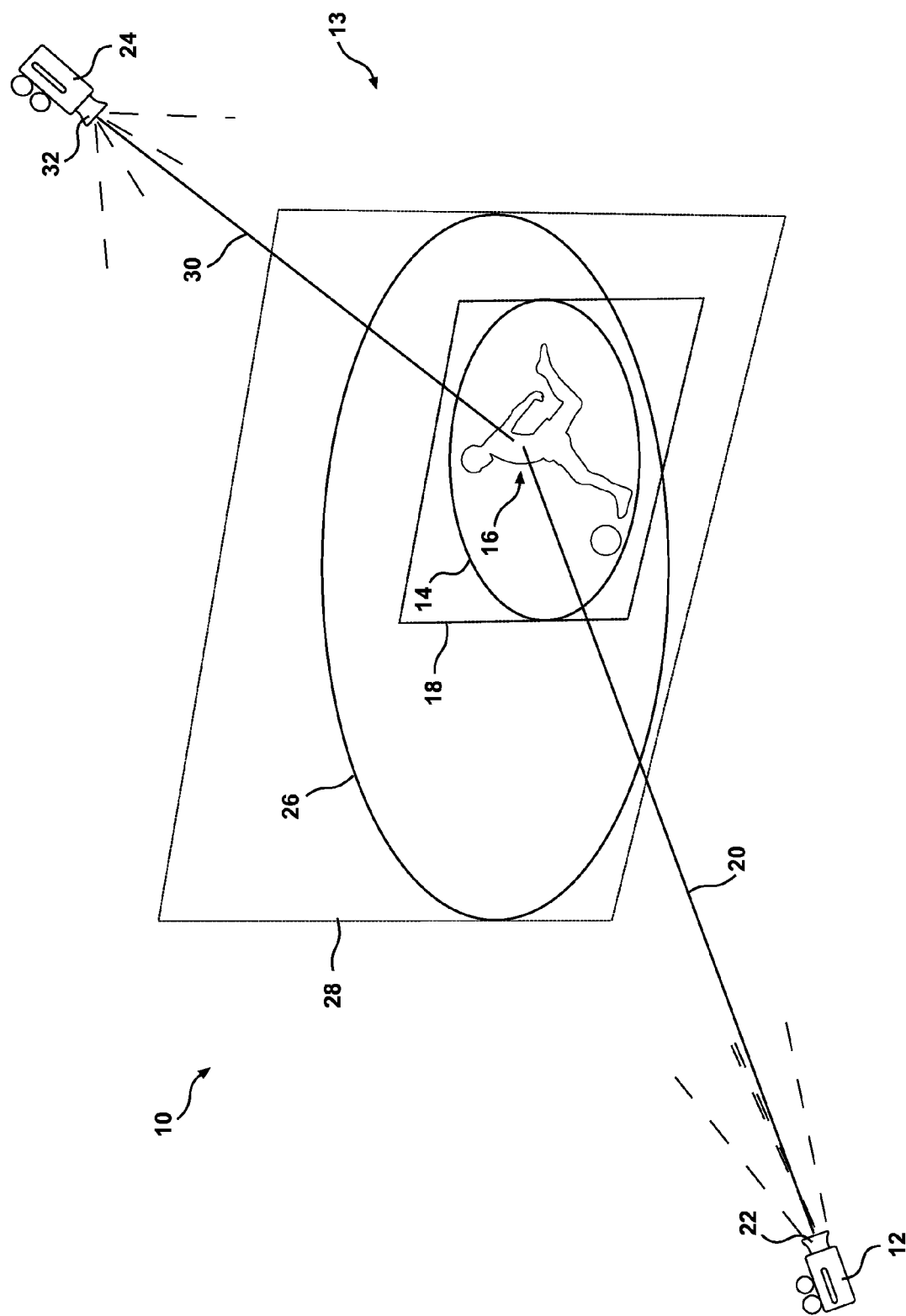
FIG. 1 is a schematic view of a primary image and the surrounding halo image, defined by a respective field of view and subject distance.

There are numerous specific details set forth in the following description. However, from the disclosure, it will be apparent to those skilled in the art that modifications and/or substitutions may be made without departing from the scope and spirit of the invention. In some circumstance specific details may have been omitted so as not to obscure the invention. Similar reference characters indicate corresponding parts throughout the drawings.

Referring to the drawings for a more detailed description, a motion picture capturing apparatus 10 is illustrated, demonstrating by way of examples arrangements in which the principles of the present invention may be employed. As illustrated in FIG. 1, the motion picture capturing apparatus includes a first camera 12 for capturing a dynamic primary image 14 of an object 16, the primary image 14 being defined by the field of view 18 and subject distance 20 of the lens 22 of the first camera 12. The apparatus 10 further including a second camera 24 for capturing a dynamic halo image 26 that contains and extends around the primary image 14, the halo image being defined by the field of view 28 and subject distance 30 of the lens 32 of the second camera 24. The dimensions of at least the halo image 26 and the position of the primary image 14 there within may be altered depending upon the direction of travel and behaviour of the object 16.

It should be appreciated that the computer generated virtual map 13 is synchronized with, or at least represents the known or mapped environment 8. The moving object 16 can be tracked using existing methods such as active or passive physical tags or a stylus and touch screen wherein an operator is able to track the movement of the object. The bias zone or zones 6 overlay the virtual map 13 and are used, either alone or in conjunction with other control systems, to control the position and size of the primary and halo images 14, 26.

Figure 2:
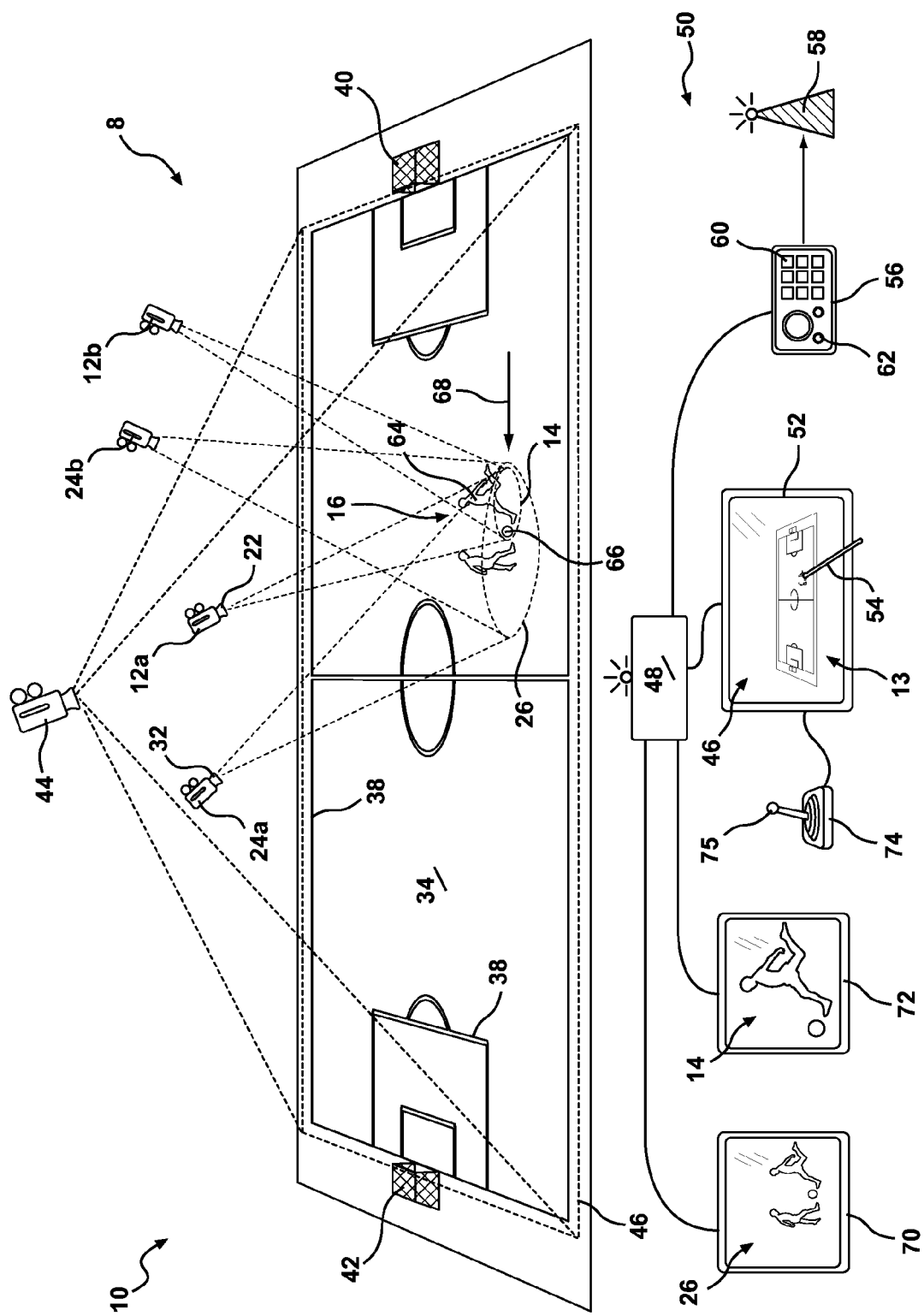
FIG. 2 is a schematic view of a first embodiment of the apparatus for camera control of the present invention.

As illustrated in FIG. 2 the apparatus 10 can be used to capture footage of a sporting contest, such as a game of soccer. The first and second cameras 12, 24 are placed around a known or mapped environment 8 in this example being a soccer field 34 having a boundary line 36, various field markings 38 and opposing goals 40, 42. A third camera 44 is configured to capture an image 46 of the playing field 34. Signals are received from and sent to cameras 12, 24 and 44 by way of communication means 48. The communication means 48 may be hard wired to the cameras or be connected by way of a transmitted/receiver.

The communication means 48 is connected to a control apparatus 50, including a touch screen 52, for displaying image 46 that is synchronized with virtual map 13, and stylus 54, for controlling the images captured by the first and second cameras 12, 24, and a broadcast switcher 56 in communication with a broadcast tower 58 for controlling the television images broadcast. The broadcast switcher 56 includes switches 60, 62 for selecting the desired images for broadcasting.

As further illustrated in FIG. 2 the object 16 is a player 64 who is kicking a ball 66 down the field 34 in the direction of arrow 68 which indicates the direction of travel. The direction of travel is communicated to the apparatus 50 via the joystick 74. When in use the image 46 of the field is displayed on the touch screen 52. The operator uses the stylus 54 to positions the track node 11 in the centre of the play between the player 64 and the soccer ball 66. The size of the images can be controlled via the rotation of the joystick's knob 75. The movement of the stylus 54 across the display means 52 generates digital signals representative of the required panning, tilting, focusing and zoom operations of the cameras 12, 24 and their lenses 22, 32 to track an object 16 across surface 34.

The operator can either select to follow an individual player that is in control of the ball or the ball itself depending upon the required shots and whether the ball is being passed between players. The movement of the stylus 54 across the screen 52 results in corresponding movement of cameras 12, 24. It should however be appreciated that the users finger or tracking subsystems could be used instead of the stylus 54 to track movement of the object 16 across the touch screen 52. The stylus 54 is used to control the first camera such that the track node 11 of the primary halo corresponds to the position of the stylus 54 on the image 46 displayed on the screen 52. In the present embodiment, the position of the stylus 54 controls the position the halo 26 around the primary image 14.

In another embodiment as illustrated in FIG. 2, the images 14, 26 captured by the first and second cameras 12, 24 are displayed on screens 70, 72. The screens 70, 72 are used so that the operator can select the best image for broadcasting. The reader should however appreciate that the display means 52 may include the images captured by the cameras or the apparatus may include a separate split screen displaying the images captured by the various connected cameras.

The apparatus 10 utilises a joystick 74 for controlling the direction of travel although in another form this joystick 74 can be used for controlling the position of the images around the track node 11. The joystick knob 75 may also be used to control the dimensions of the primary and/or halo images.

The computer includes application software for controlling the computer, receiving data from the screen 52, stylus 54 and joystick 74. The software is configured to generate appropriate signals to control the servo-assisted camera heads and encoded lenses that control pan, tilt, focus and zoom of the cameras 12, 24 depending upon the signals received from the screen 52, stylus 54 and joystick 74. Application software may be stored in a computer.

The lenses 22, 32 are calibrated either by using the manufactures data or by setting up the camera and lens in a known environment and recording the focus and zoom settings at variable distances and variable fields of view. Encoders recognise these focus and zoom settings and this data is stored, alternatively the analogy settings of the lens may be used but will not be as accurate. System algorithms utilise this data to enable automated lens control. Thus focus for each lens is achieved by knowing the distance between the camera location and the track node 11. The lens's zoom is achieved by knowing the size of the halo 14 and the distance between camera 12 and halo 14 then applying the calibrated lenses' algorithms to facilitate the correct field of view (zoom). The camera's servo driven pan tilt heads are also encoded thereby enabling the system to recognise, command and control the direction of the camera's alignment.

Figure 3A:
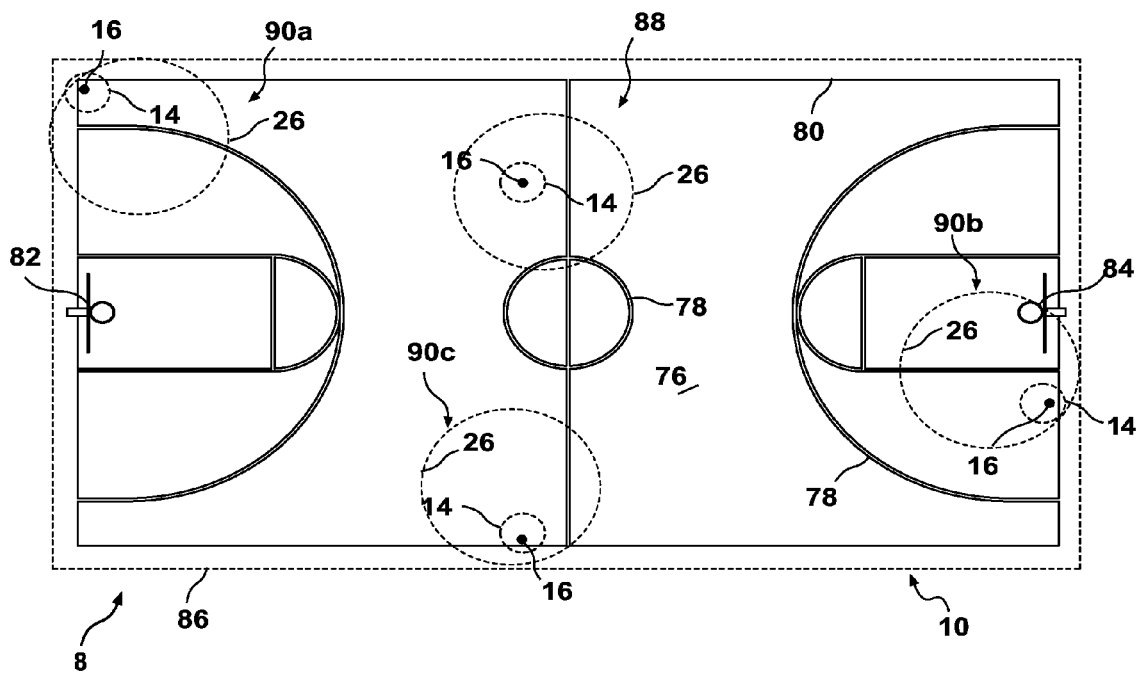
FIG. 3a is a schematic view of the various configurations of the primary image area and surrounding halo image area of FIG. 1 illustrating the bump bars around the periphery of the playing arena.

The camera control system can be used to record images of various sporting activities. As illustrated in FIG. 3a, the apparatus 10 can be used to capture footage of a basketball game played on a basketball court 76 having court markings 78, a boundary line 80 and opposing hoops 82 and 84. In one embodiment the control apparatus 50 includes a virtual map 13 of the surface of the playing surface. This virtual map 13 includes respective court marking, boundary line and position of the basketball hoop. The virtual map 13 also includes a virtual barrier or bump bar 86 that constrains the movement of the first and second cameras to thereby control the images 14, 26 that are captured. The reader should appreciate that this prevents unwanted footage being captured such as running tracks around the outside of the playing field or images of the edge of the crowd or empty seats.

As illustrated in FIG. 3*a*, when the cameras 12 and 24 are located above the playing surface, the edges of the respective field of views of cameras 12, 24, and therefore the images 14, 26 that are captured, are restrained from crossing the bump bar 86. In a situation, as illustrated by event 88, when the object 16 being tracked is at a distance from the boundary line 80, the operator can control the position of the primary image 14 within the halo image 26. However when the object comes into close proximity to the boundary line 80 as illustrated by events 90*a*, 90*b* and 90*c* the relationship between the two images 14, 26 is automatically altered by interaction with the bump bar 86. The dimensions or orientation of the halo image 26 and the primary image may both be changed. In this way the circumferentially extending bump bar 86 acts like a cushioning fence adjacent the boundary of the court to prevent unwanted footage being captured.

Figure 3B:
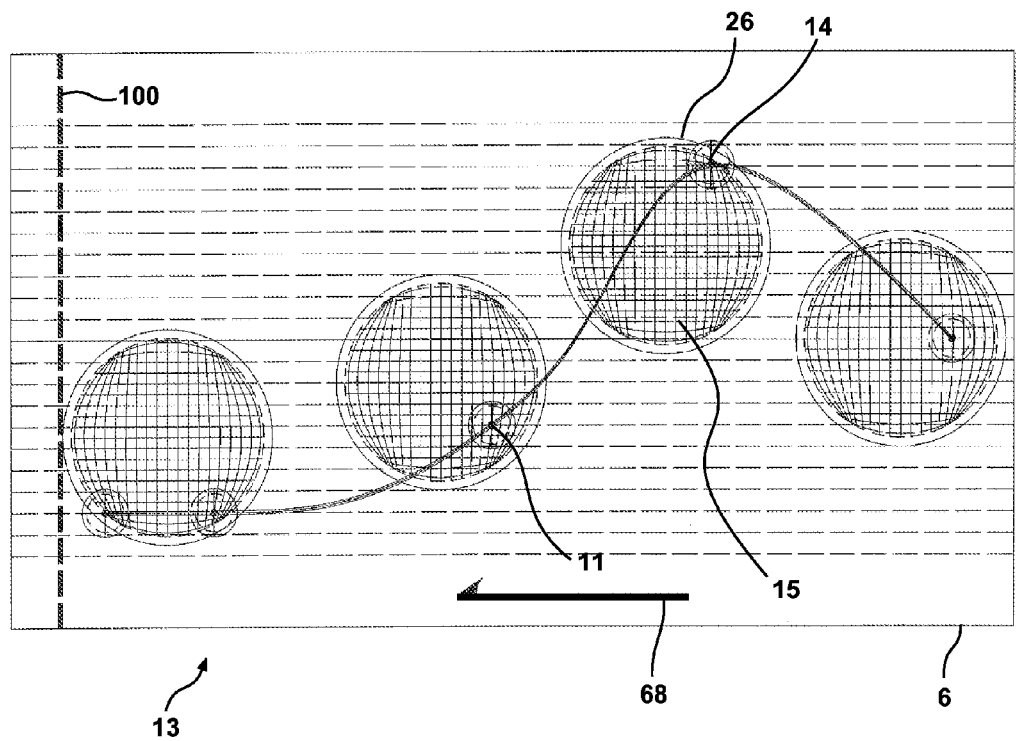
FIG. 3b is a schematic view of a primary and halo images and their interaction pattern as they move within the bias zone, showing that the interaction pattern is firstly based upon the position of the track node within the bias zone and secondly the position of the bump bars.

FIG. 3*b* illustrates the variable relationship between primary image 14 and halo image 26 dependent on the position of the track node 11 within the governed by the bias zone 6, the direction of travel 68, and the location field 15. The illustration shows that when the direction of travel 68 is 50% left then the track node 11 is +50th percentile 15 within the halo image 26 location field's y axis throughout the bias zone 6, until the halo image 26 collides with the left bump bar 100, at which time the halo image 26 stops and the primary image 14 is allowed to slide to the left within the halo image 26.

FIG. 3*b* also shows that when the track node is on the bias zone's 80% x axis alignment then the secondary image location field 15 has the track node on its' 80% x axis 17 alignment. Similarly when the track node is on the bias zone's −40% x axis alignment then the secondary location field has the track node on its' −40% x axis alignment. And once again when the track node is on the bias zone's −80% x axis alignment then the secondary location field has the track node on its' −80% x axis alignment.

The centre of the image's X & Y axis is 0% and the image's limit lines 19 are +/−100%. The properties of the bias zone 6 can also be changed, and this includes both linear and logarithmic relationships between bias zone/s 6 and the track node's position within the location field 15. Multiple overlapping bias zones 6 can be used together, which enables an averaging of the bias zones effects on the image's position around the track node or position of the moving object. This enables the halo cameras to have a particular bias towards a geographical location such as a soccer goal.

Concentric circle bias zones as in FIGS. 3*c* & 3*d* work in a different manner to those discussed previously. Concentric circle bias zones control the halo image's position around the track node. This is enabled by creating an alignment line 19*a* between the track node 11 and the centre of the bias zone 6 which is extended at the track node end so as to bisect the primary image, or alternatively the alignment line is extended an addition percentage or offset distance. The operators preset options include: fixing the size of the secondary image as per FIG. 3*c*; enabling the size of the secondary image to expand and contract while always keeping the centre of the bias zone and primary image within its limit line as per FIG. 3*d*; enabling the primary image to positioned within the secondary image in accordance with typical bias zone methods as per FIG. 3*c*; and to have the primary image always tangential to the secondary images' limit line as per FIG. 3*d*.

The method as illustrated in FIGS. 3*c* & 3*d* are useful in numerous sporting applications where goals are being used and the television viewer's focus of attention is generally where the game ball is and where the goals are. This would be the case in soccer, netball, ice hockey and basketball. Similarly in cricket, where the entire cricket pitch can be part of the bias zone centre which is always within a cameras halo as is the ball as it is hit around the cricket grounds.

FIG. 3*b* shows that the track node is central within primary image regardless of the track nodes' direction of travel or the nodes position within the bias zone, although the primary image does have the functionality as the halo image to have the track node offset within itself dependent on direction of travel and the track node's location within the bias zone.

Primary and halo images can have a preset maximum and minimum size. The centre of the image's axis are 0% and the limit line are +/−100% in all axis. Both a linear and a logarithmic relationship can be used between the direction of travel and the track node's position within the location field 15.

In another embodiment the bias zones 6, images and images location fields 15 may all be 3D spatial structures working in similar methodologies as previously described, although have 3D properties. Adopted 3D structures may include spheres, cylinders, cones, or rectangular prisms. In this instance a GPS tag would typically be used to establish real time 3D location of the track node.

Figure 3G:
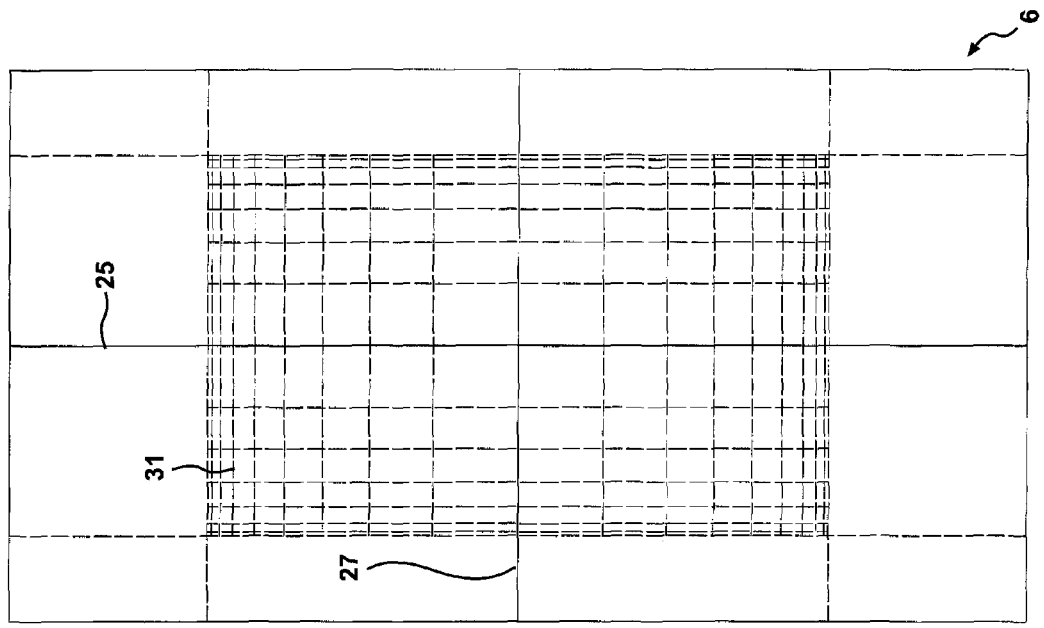
FIG. 3g is a schematic view of a bias zone and its component parts.
Figure 3H:
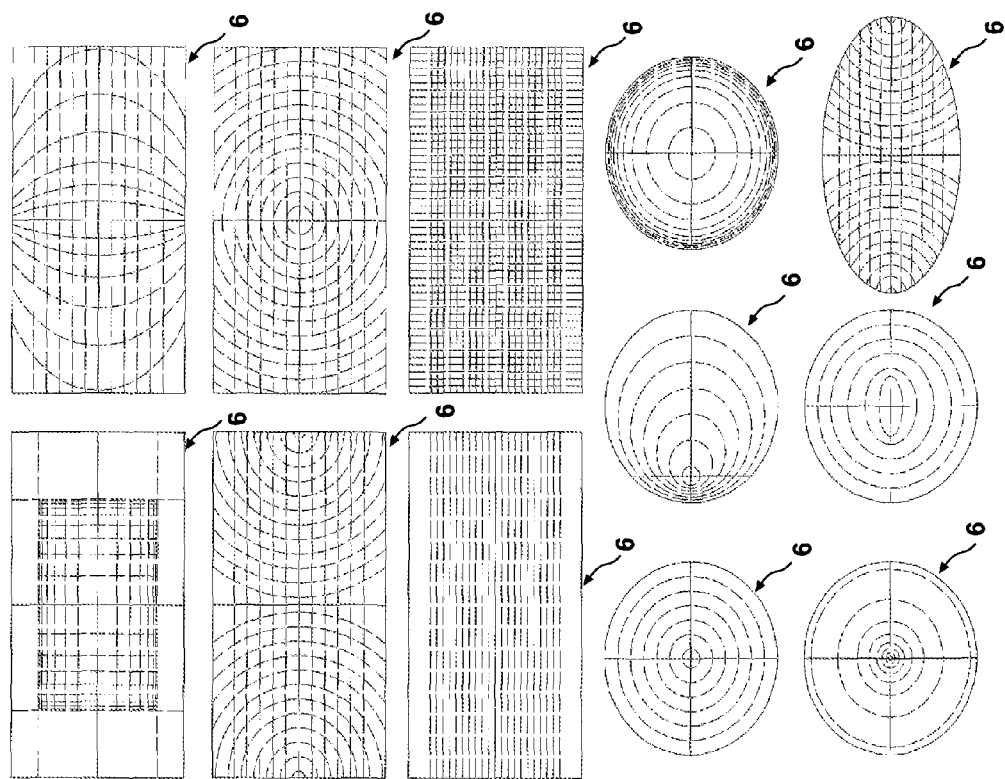
FIG. 3h is a schematic view of some of the embodiments of a bias zone.

FIGS. 3*e* and 3*f* illustrate different embodiments of the location fields 15 of halo image 26. Similar location fields 15 can be used with respect to primary image 14. FIG. 3*h* illustrates different configurations of bias zones 6, and FIG. 3*g* illustrates the bias zone 6 having different designated x and y axis, such as centre lines 25 and 27, and +60% x axis 31.

As illustrated in FIGS. 4*a* and 4*b* the virtual map 13 of the court 76 stored on the control apparatus 50 is in three dimensions. In the present embodiment the virtual map 13 includes a cutting plane 92, which is used to control the plane on which the images 14, 26 move. The height of the cutting plane 92 can be varied. The position of the stylist 54 on the cutting plane typically generates the location of Track Node. FIG. 4*a* illustrates an area 95 or image that a number of cameras may be focused on. In basketball the ball is typically passed at chest height hence the cutting plane is located at chest height as per FIG. 4*a*. Activity in soccer generally occurs at ground level, hence the cutting plane 92 would be lowered accordingly.

As further illustrated in FIGS. 4*a* and 4*b* the virtual map 13 includes barrier 96, which inhibits the vertical movement of the field of view 18 (FIG. 1) above a certain plane. The barrier 92 can be either parallel to the playing surface 76, as illustrated in FIG. 4*a* or may take any form or shape, including being sloped upwardly from a midpoint of the court to the opposing goals 82, 84, as illustrated in FIG. 4*b*. The barrier 92 above the playing surface acts like a virtual roof and prevents footage being captured of unwanted detail such as empty spectator stands.

When a target is in correct sharp focus, then the distance between the focal point of the lens and the target is known as the subject distance 20. The end point of the subject distance may be coupled to the object 16 or the centre of the images 14, 26.

Figure 5:
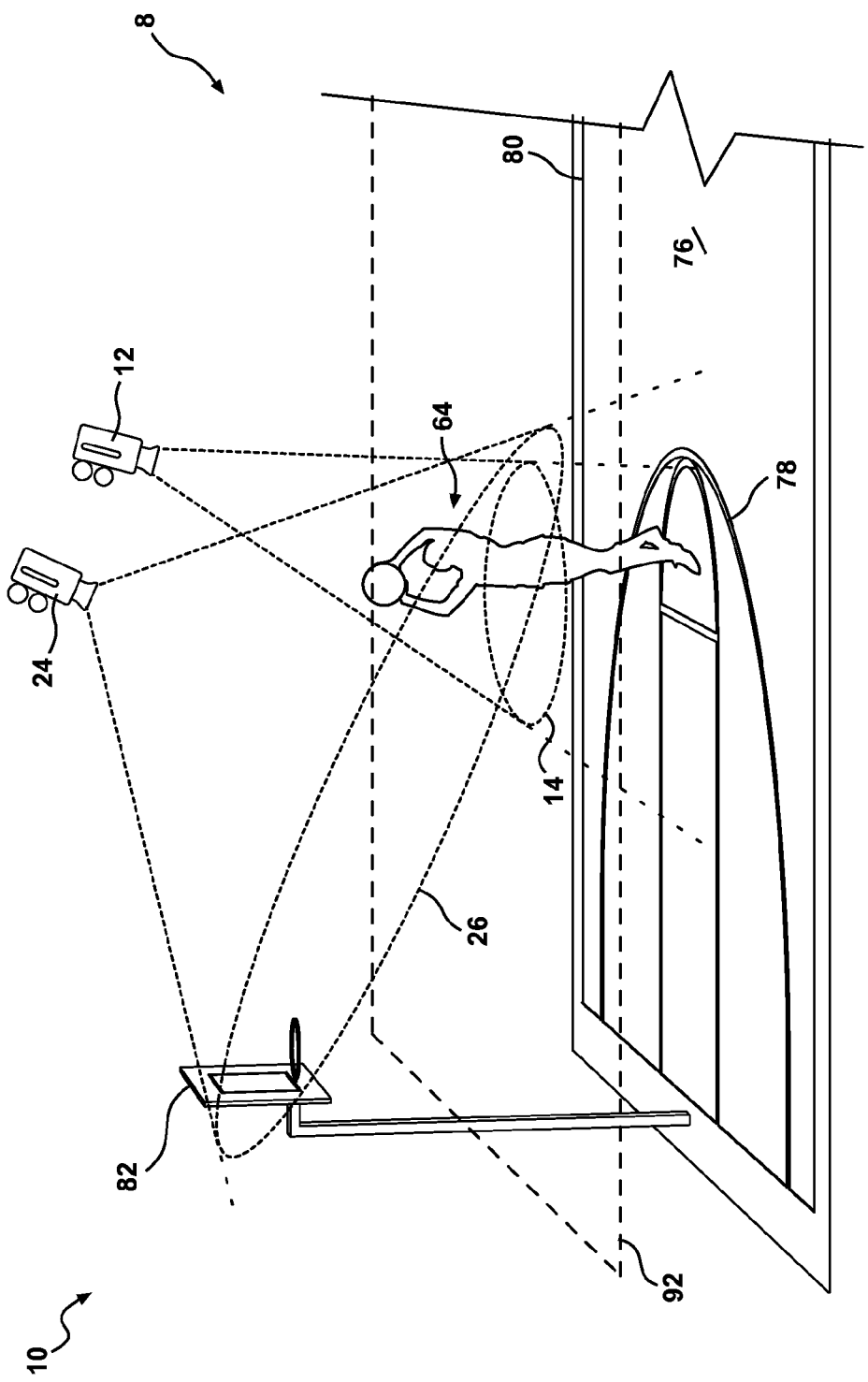
FIG. 5 is a schematic view illustrating a further embodiment.

As illustrated in FIG. 5, the plane of the halo image 26 can be offset from the plane of the primary image 14. This action may occur from a bias zone interaction affecting only halo image 26. The Image's 26 position enables both the basketball hoop 82 and player 64 to be in shot, and for the focus to be as sharp as possible.

In another form the primary and halo image may be uncoupled where by one halo image tracks an object such as a ball while the other halo image is trained in a prescribed manner onto the landing zone of the ball which is calculated via the balls trajectory. This function can be activated by the operator or be automatic.

Multiple cameras can be used to capture the primary image 14 and halo image 26 from different perspectives. As illustrated in FIG. 2, cameras 12a, 12b are used to capture respective primary images 14 and cameras 24a and 24b are used to capture respective halo images 26. It should be noted that each camera can have its own halo image and bias zone, and as such the number of halo sizes at any one time is only limited by the number of cameras. Accordingly, this gives the operator greater flexibility in selecting a suitable image for broadcasting.

Figure 6:
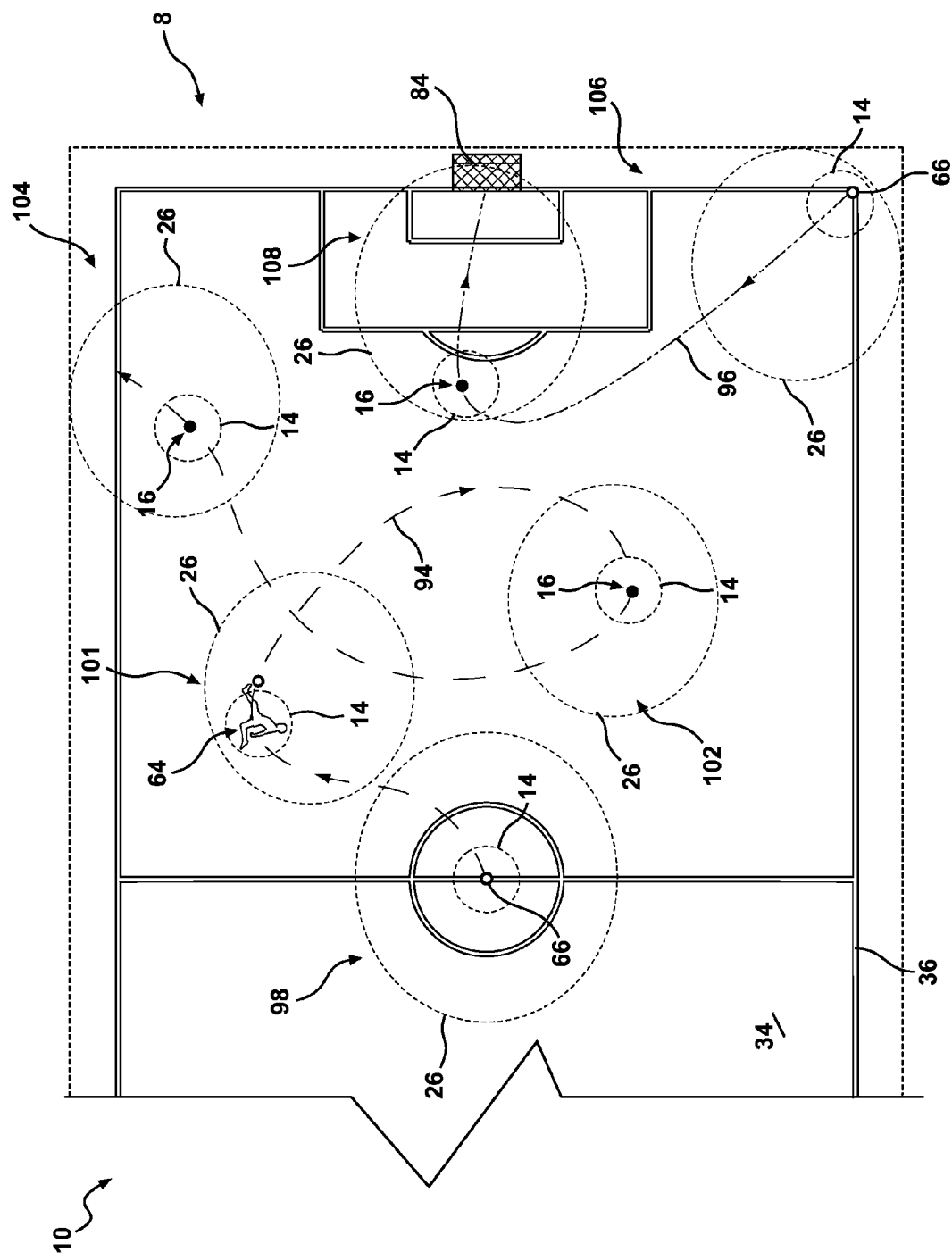
FIG. 6 is an overhead view of the movement of a player across a playing surface illustrating the position of the images captured by the first and second cameras.

As illustrated in FIG. 6, the apparatus 10 can be used to provide footage of a soccer game being played on a soccer field 34. The present example includes plays 94 and 96 that will be used to illustrate to relationship between the primary and halo images 14 and 26. The first play 94 starts at the kickoff from the centre circle, when the ball is located on the centre spot. The primary image 14 is positioned at a centre point of the halo image 26, as illustrated by event 98. This means that all players within the vicinity will be included in the halo image 26. As play progress and player 64 runs down the field, as illustrated by event 101 the primary image 14 is positioned towards the trailing edge of the halo image 26. This means that the halo image extends forward of the player 64 even when the player changes direction as illustrated by event 102. When the ball passes over the boundary line 36, as illustrated by event 104, the halo image 26 is inhibited from extending beyond the bump bar 86.

In the second play 96 a corner is taken, as illustrated by event 106, wherein the halo image 26 is enlarged to capture a larger portion of the playing field.

Although not illustrated the reader should appreciate that the halo image 26 could be large enough to capture the players in front of the goal 84.

The ball is then kicked to centre and directed into the goal 84 as illustrated by event 108. As the ball changes direction the halo image 26 captured by camera 24 also changes orientation to include the goal and goalie.

FIG. 7a illustrates the known or mapped environment 8, in the present example being a basketball court 76, and the computer generated virtual map 13 that is synchronized with the known or mapped environment 8.

FIGS. 7b and 7c illustrate different bias zone 6 configurations that can be overlaid over the virtual map 13.

As illustrated in FIG. 7b the bias zone 6 in one embodiment may comprise two ripple affect semi-circular patterns 120 and 122 that extends outwardly from the location of the opposing hoops 82 and 84. The two patterns 120 and 122 do not overlap but end around the position of the centre line 124 of the court 76.

In another embodiment, as illustrated in FIG. 7c, the bias zone 6 comprises two ripple affect semi-circular patterns 120 and 122 that extend outwardly from the location of the opposing hoops 82 and 84, and an overlapping central pattern 126 comprising a series of progressively larger circles 126. A circumferentially extending bump bar 86 is also illustrated in FIG. 7c. Where the bias zones 6 overlap an averaging of the bias zones effect is undertaken to determine the composition of the resultant images 14 and 26 and the relative position and size there between.

The skilled addressee will now appreciate the many advantages of the illustrated invention. In one form the invention provides an apparatus and method of controlling a plurality of cameras to capture footage of a sporting or stage event. The use of at least a first camera that captures a primary image that conforms to the target object and a halo image captured by a second camera having a wider field of view means that a single operator can simply and effectively control the composition of the television broadcast. The use of a central control apparatus enable the operator to control a number of cameras by simply passing a stylus over the surface of a touch screen displaying live footage of the sporting arena. The use of a synchronised map that is overlayed by a bias zone or zones means that the composition of the primary and halo images can be automatically controlled without requiring constant input from an operator when the cameras are in operation.

Various features of the invention have been particularly shown and described in connection with the exemplified embodiments of the invention, however, it must be understood that these particular arrangements merely illustrate and that the invention is not limited thereto. Accordingly the invention can include various modifications, which fall within the spirit and scope of the invention.

What is claimed is:

1. A method of obtaining a motion picture footage of a moving object located within a surveyed environment, the method including the steps of:

taking a survey of a surface of the surveyed environment;

creating a tri-dimensional virtual map of a selected environment, the tri-dimensional virtual map including at least one boundary within the surveyed environment and at least one bias zone, the tri-dimensional virtual map being stored on a control device;

capturing a dynamic primary image of said moving object using a first motion picture camera, the dynamic primary image being defined by a field of view and a distance of the moving object from a lens of the first camera;

capturing a dynamic halo image that contains and extends around said dynamic primary image using a second motion picture camera, the dynamic halo image being defined by a field of view and a distance of the moving object from a lens of the second camera, wherein dimensions of the halo image and position of the primary image are changed depending on a track node within the bias zone, the track node being a plurality of points having x, y, and z coordinates within a mathematical model created by the surveying and mapping of the surface;

determining with the control device a position of the moving object within the tri-dimensional virtual map that corresponds to a position of the moving object within the surveyed environment;

wherein the bias zone includes predefined parameters that control the position of the dynamic primary image and the dynamic halo image around the moving object, whereby in at least a first location within the bias zone the predefined parameters that determine at least one of a position, a size, and a relationship of the halo image relative to the primary image, are different to the predefined parameters of at least a second location within the bias zone;

wherein said first and second motion picture cameras being controlled such that the at least one of a position, a size, and a relationship of the halo image relative to the primary image is altered;

the at least one of the position, the size, and the relationship of the halo image relative to the primary image is controlled by said at least one bias zone, and the position of said moving object within said surveyed environment corresponding to at least the first or second locations within the bias zone of said tri-dimensional virtual map, dictates how the primary and halo images are at least one of positioned or resized around the moving object.

2. The method in accordance with claim 1, wherein the first and second motion picture cameras are controlled such that the primary image retains a portion of the halo image and the position of the halo image relative to the primary image is altered.

3. The method in accordance with claim 1, wherein the first and second motion picture cameras configured to capture the primary and halo images, having respective fields of view and subject distances are altered relative to the other motion picture camera or independent thereof.

4. The method in accordance with claim 1, wherein said moving object is a dynamic target, selected from a sports player, a ball, or a stage performer, and the surveyed environment is selected from a sporting arena or a stage, and wherein the primary and the halo images include a motion picture footage of at least the dynamic target.

5. The method in accordance with claim 4, wherein the primary and the halo images further include a motion picture footage of an individual or individuals engaged in a sporting contest, goals, wickets, relevant line markings, or stage sets.

6. The method in accordance with claim 1, wherein the moving object is tracked using a tracking device, wherein at least one of said first or second cameras is assigned to follow said moving object.

7. The method in accordance with claim 6, wherein the tracking device includes an RF or a GPS tag in communication with a control device for controlling an operation of the first and second cameras to capture the primary and the halo images.

8. The method in accordance with claim 1, wherein the dynamic halo image is coupled to the dynamic primary image, and is positioned around, such that the movement of the second motion picture camera is dependent upon the movement of the first motion picture camera.

9. The method in accordance with claim 1, wherein the dynamic halo image is uncoupled from the dynamic primary image such that the first motion picture camera capturing the dynamic primary image follows the trajectory of a ball and the second motion picture camera capturing the dynamic halo image is captured footage of the expected landing area that has been calculated from the trajectory of said ball.

10. The method in accordance with claim 1, wherein a plurality of halo images surrounds the primary image.

11. The method in accordance with claim 1, wherein the height of the primary and the halo images from a ground plane of a stage or sporting field varies.

12. The method in accordance with claim 1, wherein a camera's center of view has an angular or a distance offset relative to a respective center of the primary or the halo images.

13. The method in accordance with claim 10, wherein the track node on said computer generated virtual map is assigned to a tracked object, and a height of the track node from the ground plane of the stage or sporting field varies.

14. The method in accordance with claim 13, wherein a track node's location on an x axis and a y axis within the tri-dimensional virtual map is determined on a cutting plane, which has a prescribed z axis value within the virtual map, either manually by an operator or by a tracking system.

15. The method in accordance with claim 13, wherein the position of the track node within the bias zone affects a spatial relationship between the track node and the primary and the halo images.

16. The method in accordance with claim 1, wherein the movement of the primary and the halo images is restrained from traveling past designated alignments in both the horizontal and vertical planes.

17. The method in accordance with claim 1, wherein the steps of capturing the primary image and the halo image are undertaken using designated software and hardware.

18. A motion picture capturing apparatus comprising:
a first camera for capturing a dynamic primary image of a moving object located within a surveyed environment, the dynamic primary image being defined by a field of view and a distance of the moving object from a lens of the first camera;
at least one second camera for capturing a dynamic halo image that contains and extends around the dynamic primary image, the dynamic primary image being different from the secondary image, the dynamic halo image being defined by a field of view and a distance of the moving object from a lens of the second camera, wherein dimensions of the halo image and position of the primary image are changed depending on a track node within the bias zone, the track node being a plurality of points having x, y, and z coordinates within a mathematical model created by the surveying and mapping of the surface;
a control device for controlling a position of said dynamic halo image around said dynamic primary image, the control device determines a position of the moving object within the tri-dimensional virtual map that corresponds to a position of the moving object within the surveyed environment;
wherein the control device includes a computer generated tri-dimensional virtual map of the surveyed environment, the tri-dimensional virtual map being created by taking a survey of a surface of a selected environment and from the survey data, the tri-dimensional virtual map including at least one boundary within the selected environment and having at least one bias zone, the bias zone includes predefined parameters that control the position of the dynamic primary image and the dynamic halo image around the moving object, whereby in at least a first location within the bias zone the predefined parameters that determine at least one of a position, a size, and a relationship of the halo image relative to the primary image, are different to the predefined parameters of at least a second location within the bias zone;
wherein said first and second motion picture cameras being controlled such that the at least one of a position, a size, and a relationship of the halo image relative to the primary image is altered;
the at least one of the position, the size, and the relationship of the halo image relative to the primary image is controlled by said at least one bias zone, and the position of said moving object within said surveyed environment corresponding to at least the first or second locations within the bias zone of said tri-dimensional virtual map, dictates how the primary and halo images are at least one of positioned and resized around the moving object;

wherein positioned within the tri-dimensional virtual map that corresponds to the position of said moving object within said surveyed environment dictates how the primary and halo images are at least one of positioned and resized around the moving object.

19. The motion picture capturing apparatus in accordance with claim 18, wherein said first camera and said at least one second camera are controlled by servo assisted pan tilt heads and by servo assisted lenses configured to control a focus, a zoom, and a direction of said first camera and said at least one second camera, wherein at least one of the focus, the zoom, and the direction of said first camera and said at least one second camera are altered by use of said control device that includes a user interface, whereby the position of the halo image relative to the primary image is altered.

20. The motion picture capturing apparatus in accordance with claim 19, wherein a user interface includes a touch screen showing in an overlapping manner, at least a motion picture footage of said moving object and a computer generated tri-dimensional virtual map of a defined area for synchronizing with the motion picture footage, the defined area being selected from a group including a sporting arena, a playing field, a playing court, a stage, a room, a pitch, or an oval.

21. The method according to claim 1, wherein the dimensions of the halo image and position of the primary image are changed depending on the track node within the bias zone and a travel direction of said moving object.

* * * * *